April 18, 1950            E. C. GEORGE            2,504,823
DIE CAST ROTOR WITH TUBULAR INSERTS
EMBEDDED IN DESTRUCTIBLE MATERIAL
Filed March 24, 1948

Inventor
Edgar C. George
by Didier Journeaux
Attorney

Patented Apr. 18, 1950

2,504,823

UNITED STATES PATENT OFFICE 2,504,823

DIE CAST ROTOR WITH TUBULAR INSERTS EMBEDDED IN DESTRUCTIBLE MATERIAL

Edgar C. George, Cincinnati, Ohio, assignor to Allis-Chalmers Manufacturing Company, Milwaukee, Wis., a corporation of Delaware Application March 24, 1948, Serial No. 16,664

4 Claims. (Cl. 22—203)

This invention relates generally to improvements in the manufacture of electric motors and refers particularly to ventilated squirrel cage rotors of the cast type now common in the art and to methods of making the same.

It is an object of this invention to provide a method of forming radial ventilating passages in a rotor through the use of a spacer between groups of laminations, the spacer being at least partly made of any suitable material that is readily removable from the rotor after casting the rotor conductors.

It is also an object of this invention to maintain groups of rotor laminations permanently spaced before and after casting by the provision of permanent spacing means which remain when the temporary spacer material is removed.

The objects of the invention are preferably attained by the use of a spacer made of a friable material, such as plaster of Paris, having tubular inserts which align with the conductor bar slots to cooperate with the slots to form a mold for the cast rotor conductors when interposed between two groups of stacked laminations.

Figure 1:
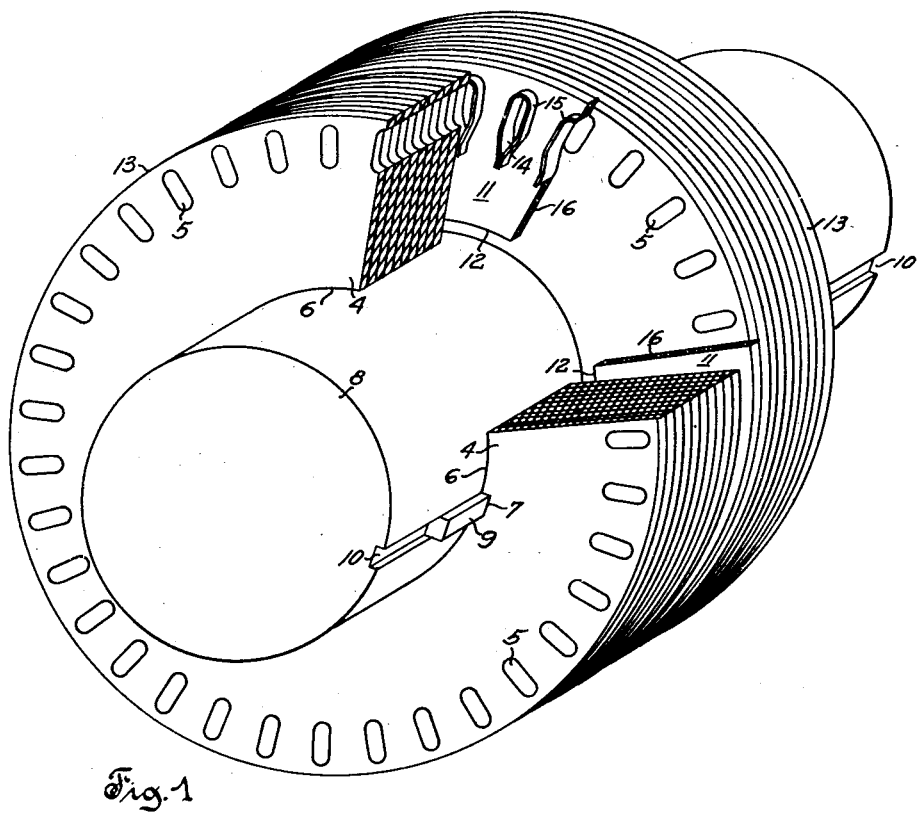
Figure 2:
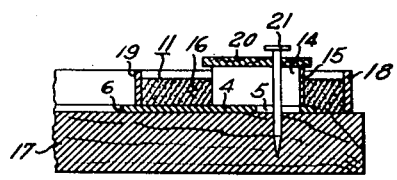

The novel features that I consider characteristic of this invention are set forth with particularity in the appended claims. The invention itself, together with objects and advantages thereof, will best be understood from the following description of a specific embodiment when read in connection with the accompanying drawing, in which:

Fig. 1 is an oblique view of the assembled laminations and of a spacer for a die cast rotor showing parts thereof broken away; and Fig. 2 is a partial cross sectional view of a spacer and of the means for forming the same.

Referring now particularly to the accompanying drawing, the numeral 4 designates the rotor laminations which are punched from thin sheets of steel of a suitable grade.

The laminations 4 are punched to provide conductor bar slots 5, and a bore 6 having a keyway 7 for reception of a spider mounted on a rotor shaft.

For casting the rotor conductors the laminations 4 are stacked on a mandrel 8 having a keyway 10 and are aligned with each other by means of a key 9 driven in the keyways of the laminations and of the mandrel.

The keyways may be parallel to the mandrel axis so that the conductor bar slots of the assembled laminations align without skew, or the keyways may be helical to cause the aligned conductor bar slots of the assembled laminations to be stacked with skew.

To provide one or more radial ventilating ducts in the finished rotor, at least one spacer 11 is inserted between groups of laminations 4.

Such spacer is made at least partly of any easily removable material, such as a friable material like plaster of Paris which may be reinforced. Spacer 11 is shown as made to somewhat larger inner and outer diameters than the laminations 4 to define a bore perimeter 12 and an outer perimeter 13.

The spacer is provided with openings 14 disposed about the spacer similarly to the conductor bar slots 5 disposed in the laminations, so as to align therewith when the spacer and laminations are assembled. The openings 14 may be formed in the spacer material in any suitable manner. In spacer 11 the openings 14 are formed by tubular inserts 15 about which the spacer material, plaster of Paris, has been cast.

The spacer 11 is made to any desired thickness. When tubular inserts 15 are used, the material in which the inserts are embedded is preferably made to a thickness somewhat less than the length of the inserts.

The openings of the spacer, or of its tubular inserts, cooperate with the conductor bar slots of the adjacent laminations to form a mold for casting the conductor bars in the aligned slots and spacer openings.

The openings 14 may be larger than the conductor bar slots 5 to form enlargements of the conductor bars upon casting. The openings may also be of the same size and configuration as the conductor bar slots in the laminations to form, upon casting, conductor bars of uniform cross section throughout the core of the rotor.

After the core laminations 4 have been properly assembled with their slots 5 aligned and with at least one spacer interposed therebetween with its openings 14 aligned with the conductor bar slots 5, the conductor bars are cast in the slots of the laminations, the molten metal filling all of the slots of the laminations and all of the openings of the spacer. At the same time the end rings may also be cast by means now common in the art.

After casting the conductor bars, the friable material of spacer 11 is crushed and removed from between its two adjacent laminations. Removal of the spacer material 16 leaves radial ventilating ducts between the conductor bars and the two adjacent laminations. The enlargements of the conductor bars act as permanent spacers between the two groups of laminations now divided by the radial ventilating ducts.

The tubular inserts 15, if used, more exactly limit the size and form of the conductor bars between the two groups of laminations, and upon removal of the body of the spacer material, the tubular inserts 15 remain integral with the conductor bars to form permanent spacers between the two adjacent laminations.

In the embodiment of the invention illustrated, the laminations are punched to a bore 6 to fit a spider mounted on a rotor shaft, the spider providing the longitudinal ventilating passages connecting with the radial ventilating passages. Obviously, the same result can be achieved by means of a splined shaft forming ventilating ducts, or by using laminations punched to provide longitudinal ventilating passages and mounting the core directly on the rotor shaft.

In the embodiment shown in the drawing the body of the spacer is assumed to be of a friable material, such as plaster of Paris. It could, however, well be made of asbestos with a suitable binder, or it could be made of any other readily removable material; material that is readily decomposable, soluble, combustible or fusible. Some specific examples of readily removable materials are: pressed paper that can be heated to carbonize it for easy removal; soluble or fusible synthetic resins; and an alloy having a melting point below that of the cast conductor bars.

After casting the conductor bars the body of the spacer material is removed by an appropriate method depending on the material used.

Figure 2 illustrates a simple means of constructing a spacer from a material such as plaster of Paris. Tubular inserts 15 are disposed about a circle on a lamination 4 in alignment with the slots 5 thereof. Each insert is securely fastened to a base plate 17 by suitable means such as a block 20 and a nail 21. On this base plate and surrounding the tubular inserts is a molding ring 18 which is the form for the outer periphery of the spacer.

The form for the inner diameter of the spacer is another molding ring 19. A body 16 of plaster of Paris is cast about the tubular inserts and the lamination within the area between the inner and outer molding rings. The lamination thus becomes embedded in the plaster of Paris and may be retained to form a part of both the spacer and the finished rotor. The spacer is disposed on mandrel 8 with the keyway of the lamination engaging key 9, whereby the openings 14 of tubular inserts 15 are automatically aligned with the bar slots 5 of the rotor.

From the foregoing description taken in connection with the accompanying drawing, it will be readily apparent to those skilled in the art that this invention provides a spacer than can be economically produced as well as an improved method of providing squirrel cage rotors with radial ventilating passages.

It is claimed and desired to secure by Letters Patent:

1. The method of making a squirrel cage rotor having cast conductor bars embedded in slots of a laminated core comprising the steps of disposing a plurality of metallic tubular inserts of predetermined length in a circle, embedding said inserts in a body of friable material of a thickness less than said length to form a spacer, assembling the core laminations with their slots properly aligned, inserting said spacer between two adjacent laminations with said metallic tubular inserts disposed in alignment with the conductor bar slots of the laminations, and at least one of said adjacent laminations in contact with said metallic tubular inserts and out of contact with said friable material, casting the conductor bars into said slots, said bars filling the conductor slots and all of said tubular inserts, to form permanent spacers between said two adjacent laminations integral with said conductors and tubular inserts; and subsequently crushing and removing said friable material and leaving said tubular inserts to form radial ventilating ducts between said tubular inserts and said two adjacent laminations.

2. A spacer for insertion in a ventilating duct of a laminated squirrel cage rotor having slots to be provided with cast conductor bars, said spacer comprising a body of plaster of Paris and a plurality of metal tubes disposed therein so said tubes align with the conductor bar slots of the laminations of said rotor to form a mold for said conductor bars, said body of plaster of Paris having a thickness substantially less than the length of said tubes.

3. A spacer for insertion in a ventilating duct of a laminated squirrel cage rotor having slots to be provided with cast conductor bars, said spacer comprising a body of destructible material and a plurality of metal tubes disposed therein so said tubes align with the conductor bar slots of the laminations of said rotor to form a mold for said conductor bars, said body of destructible material having a thickness substantially less than the length of said tubes.

4. A spacer for insertion in a ventilating duct of a laminated squirrel cage rotor having slots to be provided with cast conductor bars, said spacer comprising a body of friable material and a plurality of metal tubes disposed therein so said tubes align with the conductor bar slots of the laminations of said rotor to form a mold for said conductor bars, said body of friable material having a thickness substantially less than the length of said tubes.

EDGAR C. GEORGE.

REFERENCES CITED

The following references are of record in the file of this patent:

UNITED STATES PATENTS

| Number | Name | Date |
|---|---|---|
| 1,913,138 | Apple | June 6, 1933 |
| 2,176,871 | Harrell et al. | Oct. 24, 1939 |
| 2,368,295 | Goran | Jan. 30, 1945 |
| 2,368,296 | Goran | Jan. 30, 1945 |
| 2,370,458 | Goran | Feb. 27, 1945 |

FOREIGN PATENTS

| Number | Country | Date |
|---|---|---|
| 16,811 | Great Britain | 1909 |